(12) United States Patent
Ozkaragoz et al.

(10) Patent No.: US 8,798,999 B2
(45) Date of Patent: *Aug. 5, 2014

(54) DIALOG DESIGN TOOL AND METHOD

(75) Inventors: Inci Ozkaragoz, Torrance, CA (US);
Yan Wang, Torrance, CA (US);
Benjamin Ao, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 350 days.

This patent is subject to a terminal disclaimer.

(21) Appl. No.: 13/286,817

(22) Filed: Nov. 1, 2011

(65) Prior Publication Data

US 2012/0081371 A1 Apr. 5, 2012

Related U.S. Application Data

(63) Continuation-in-part of application No. 12/434,394, filed on May 1, 2009, now Pat. No. 8,346,560.

(51) Int. Cl.
*G10L 21/00* (2013.01)
*G10L 21/06* (2013.01)
*G06F 3/00* (2006.01)
*G06F 3/048* (2013.01)
*G06F 17/28* (2006.01)
*G06F 9/44* (2006.01)

(52) U.S. Cl.
CPC ............... *G06F 17/289* (2013.01); *G06F 8/38* (2013.01)
USPC ............ 704/270; 704/276; 715/727; 715/764

(58) Field of Classification Search
None
See application file for complete search history.

(56) References Cited

U.S. PATENT DOCUMENTS

| 4,785,408 | A | * | 11/1988 | Britton et al. ................. 704/270 |
| 5,577,165 | A | | 11/1996 | Takebayashi et al. |
| 6,510,411 | B1 | | 1/2003 | Norton et al. |
| 7,206,391 | B2 | * | 4/2007 | Chiu et al. ................. 379/88.25 |
| 7,856,620 | B1 | * | 12/2010 | Fleischer et al. .............. 717/109 |
| 7,930,182 | B2 | * | 4/2011 | Sinai et al. .................... 704/270 |
| 8,433,053 | B2 | * | 4/2013 | Ulug et al. ............... 379/266.07 |
| 8,503,665 | B1 | * | 8/2013 | Meisel ..................... 379/266.07 |
| 2005/0043953 | A1 | * | 2/2005 | Winterkamp et al. ........ 704/275 |
| 2005/0246174 | A1 | * | 11/2005 | DeGolia ........................ 704/270 |
| 2005/0278180 | A1 | * | 12/2005 | O'Neill et al. ................ 704/275 |
| 2005/0283764 | A1 | * | 12/2005 | Chiu .............................. 717/125 |
| 2007/0021962 | A1 | * | 1/2007 | Oerder .......................... 704/275 |
| 2007/0219803 | A1 | * | 9/2007 | Chiu et al. ................. 704/270.1 |
| 2008/0084971 | A1 | * | 4/2008 | Dhanakshirur ............ 379/88.01 |

FOREIGN PATENT DOCUMENTS

| JP | 10-154070 | 6/1998 |
| JP | 11-110200 | 4/1999 |

* cited by examiner

*Primary Examiner* — Brian Albertalli
(74) *Attorney, Agent, or Firm* — Muramatsu & Associates

(57) ABSTRACT

A dialog design tool includes a dialog manager including a system prompt generator and a response generator which allows a dialog designer to generate at least one response; a dialog synthesizer for structurally managing the input and response; and an output and display unit for outputting and displaying at least one dialog structure. At least one system prompt and at least one response are included in each state, and a linking unit may link a first state to a second state related to the first state, link the second state to a third state, and so on until certain system actions can be achieved. A dialog synthesizer includes a loop detecting unit which detects and identifies loops in the dialog structure. Thus, the dialog design tool facilitates the creation of natural language dialogs by creating data structures for voice user interfaces.

17 Claims, 17 Drawing Sheets

| Exchange Report | | |
|---|---|---|
| GetContext | | |
| System prompts | | |
| S: | What would you like to do? | Regular |
| S: | Would you like to navigate, play music, make a phone call... | Coach |
| Next Link | | |
| U: | What am I supposed to say? | |
| Link to State: | GetContext | |
| Next Link | | |
| U: | Play music | High CS |
| Link to State: | GetMusicInfo | |
| Next Link | | |
| U: | Play music | Mod CS |
| Link to State: | Verify | |
| Next Link | | |
| U: | Play music | Low CS |
| Link to State: | ErrorRepair1 | |

FIG. 5B

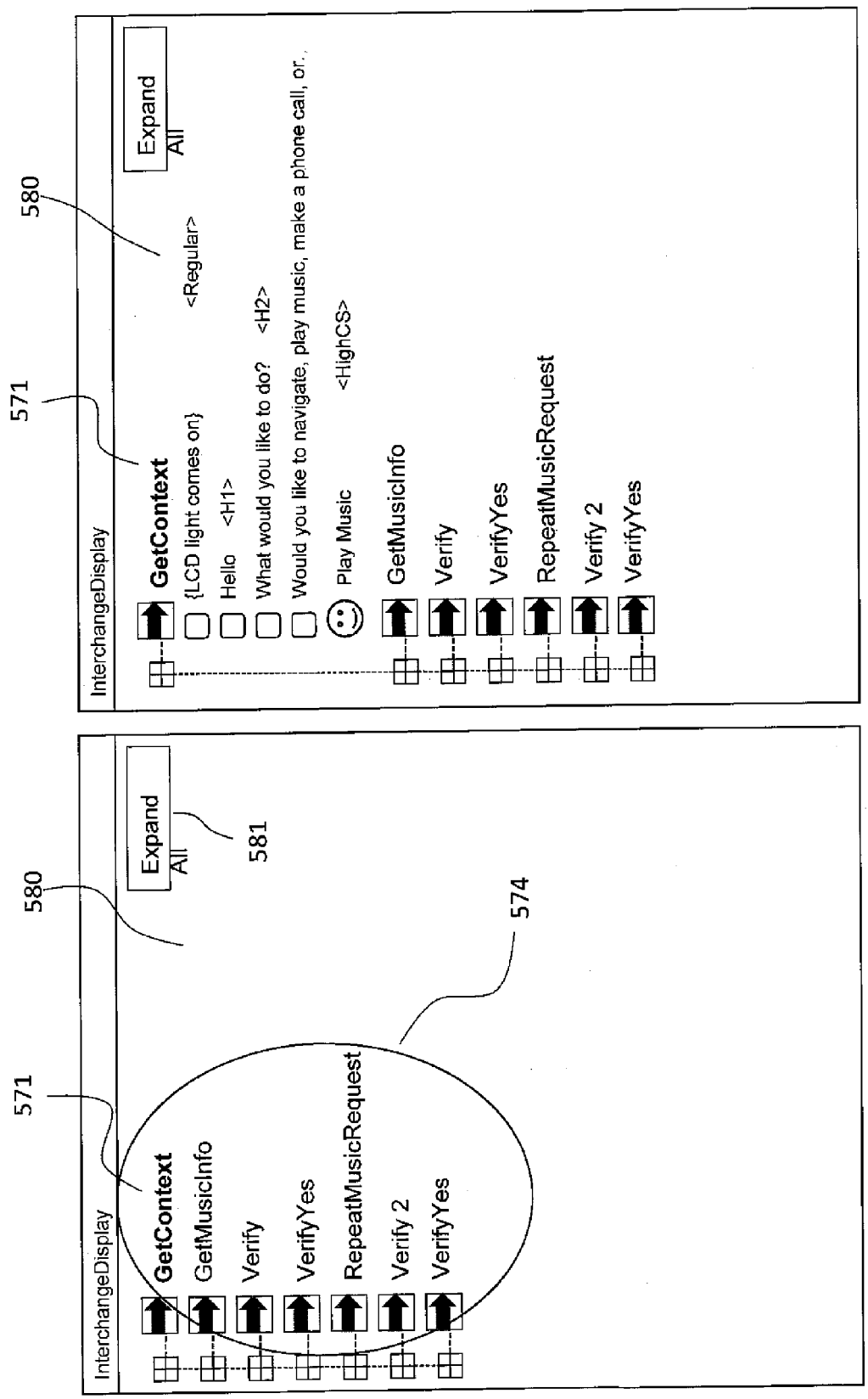

DIALOG DESIGN TOOL AND METHOD

CROSS REFERENCE TO RELATED APPLICATION

This application is a continuation-in-part application of U.S. patent application Ser. No. 12/434,394 filed May 1, 2009 now U.S. Pat. No. 8,346,560, the entirety of which is incorporated herein by reference.

FIELD

Embodiments described herein relate to a dialog design tool and a method of dialog design. More specifically, the embodiments relate to a state oriented dialog design tool and method to facilitate the creation of natural language dialogs and their data structures for voice user interfaces.

BACKGROUND

With the remarkable advance in information technology, computers have become more and more important in our daily lives. Computer software or hardware engineers are no longer the only group of people interacting with computers. Consequently, non-technical users may still feel uncomfortable when interacting with computers because common "human-computer" interaction interfaces, such as a keyboard and mouse, are unnatural to operate and not user-friendly. Furthermore, in some user contexts such as driving a vehicle, such interfaces are not an option due to safety considerations.

To overcome this problem, voice user interface systems have been developed to provide a friendlier "human-computer" interface to allow users to communicate with computers with spoken dialogs. Meanwhile, computers have been equipped with speech recognition and analyzing capability to convert the spoken dialogs into a machine readable format, and dialog developers anticipate and design possible dialogs to facilitate natural language dialogs between computers and computer users.

In designing the dialogs, a dialog developer needs to focus on scripting system prompts and user responses maintaining natural flows of the dialogs, at the same time, the dialog developer may have to develop underlying codes for the dialog while scripting the dialog. However, it is almost impossible for the dialog developer to handle both tasks well, because the skill set required for each task is substantially different. Thus, a tool and method which allows the developer to focus directly on the dialog flow development with an easy to use graphic interface is highly desirable.

During the process of dialog development, data content and structure rapidly expand and can lead to a large number of possible dialog paths. If an error occurs in one of the dialog paths, it would be difficult and time-consuming for the dialog designer to locate the exact position of the error in order to correct it. Therefore, it would be helpful to the dialog designer if he or she could oversee the structure or network of the dialog paths in order to quickly identify the location of the error and correct the contents of the dialog more readily.

A "loop" is a common problem in dialog design, meaning that the dialog path does not proceed to a desirable ending, but keeps repeating or "looping back" to the same instance of dialog. For example, the loop problem may occur if one of the prompts in the dialog path is "where do you want to go?" and the dialog flow keeps going back to this prompt without reaching any meaningful ending of the dialog. However, the loop does not always indicate an error, for instance, if the user does not provide a clear and unambiguous response, the system may want to loop a verification prompt back for a clearer and more unambiguous response from the user. A dialog design tool which helps the dialog designer identify and detect loops in the dialog paths is also highly desirable.

Japanese patent publication by Amemiya (JP 10-154070) discloses a user interface design apparatus and method. More particularly, this publication describes that a link is attached to each object to facilitate user interface simulation which is designed by a user. It states that the first link is designated through user operation to a second object which is correlated with the content of the first object, and a second link is generated to connect a third object which is associated with the content of the second object. However, Amemiya does not disclose how to locate a loop in a dialog path, nor provide the user an overview of the dialog path network and a quick way to retrieve contents of dialogs.

U.S. Pat. No. 5,577,165 by Takebayashi et al. discloses a speech dialog system capable of realizing natural and smooth dialog between the system and a human user, and easy maneuverability of the system. The dialog between the system and the user is managed by controlling transitions between user states during which the input speech is to be entered and system states during which the system response is to be outputted. However, Takebayashi does not disclose either how to visualize the network of the dialog paths, or how to detect and identify the loop in the dialog path.

U.S. Pat. No. 6,510,411 to Norton et al. discloses a task oriented dialog model and manager to simplify the process of developing call or dialog flows for use in a spoken dialog system. By using this dialog development tool, it is only necessary for the developer to input the application or task specific information into the development tool and leave management of the call flow and other generic tasks to the dialog manager as disclosed in this patent. However, like Takebayashi illustrated above, Norton also does not disclose or show how to visualize the network of the dialog paths, or how to detect a loop or loops in the dialog path in the dialog model. Furthermore, Norton discloses a task oriented dialog model instead of a state oriented model as in the present invention.

WO 02/37268 to Scholz et al. discloses a Dialog Flow Interpreter (DFI) for implementing low-level details of dialogs, as well as translator object classes for handling specific types of data (e.g., currency, dates, string, variables, etc.). More particularly, the DFI is able to drive the entire dialog of a speech application from start to finish automatically, thus eliminating a crucial and often complex task of dialog management. Even though Scholz discloses generating Data File 220, it does not disclose or teach anything related to how to manage the data file, such as how to visualize the network of the dialog paths, or how to detect a loop or loops in the dialog path, similar to the references mentioned above.

Therefore, there remains a need for a new and improved dialog design tool and method which allow the dialog developer to design natural language dialogs and create easily extractable data structure for voice user interfaces.

SUMMARY

In one aspect, a dialog design tool and method for a dialog designer is provided to assist creating system prompts and responses while maintaining the natural flow of the dialog.

In another aspect, a dialog design tool and method for a dialog designer is provided to navigate through all dialog paths and loops, if any.

In another aspect, a dialog design tool and method for a dialog designer is provided to monitor a dialog structure of a dialog design and to retrieve contents of dialogs therein.

In another aspect, a dialog design tool and method for the dialog designer is provided to easily extract language data structure and test the extracted language data structure with a speech synthesizer.

According to one aspect, a system for developing state oriented dialogs includes: a system prompt generator for generating at least one system prompt; a response generator for the dialog designer to generate at least one response according to the at least one system prompt; a dialog path forming unit for structurally linking one state to at least another one state which includes at least one system prompt and at least one corresponding response; and an output and display unit for outputting and displaying at least one dialog path and the contents therein.

The system prompt generator includes a message inputting unit which receives and displays the prompt designed and entered by the dialog designer. In one embodiment, the message inputting unit may include a prompt indicator to indicate whether the message entered by the dialog designer is a regular question, a hint or a coaching style question.

The response generator includes a response generating unit to generate at least one response according to the prompt generated by the system prompt generator. The response generator may further include a condition indicator to indicate the likelihood that the system correctly interpreted the language spoken by the user. A "confidence score" may be assigned in the condition indicator and provided to the response generator to generate a reasonable response according to the correct meaning of the entry. The dialog designer may have to consider the confidence score while designing the dialogs. If the confident score is considered high, the dialog may proceed to a next state, however, if the confidence score is moderate or low, the dialog may not proceed, and may be linked to a verifying state to further verify the user's response, or to an error repeat state where the user can repeat the response.

The dialog path forming unit links one state to at least another one state which includes at least one prompt and corresponding response, with a dialog path. The dialog structure generated by the dialog path forming unit can be extracted and tested in a dialog synthesizer. The dialog path forming unit may include a loop detecting unit which detects and identifies a loop in the dialog path.

The output and display unit may include an output unit being operatively coupled with the dialog synthesizer which extracts and tests the dialogs in at least a portion of the dialog paths as well as being coupled with mass storage to receive the dialogs into the file as a dialog database. The output and display unit may also include a display unit to display at least a portion of the dialogs in the dialog structure.

In another aspect, a method of developing a dialog includes: inputting at least one prompt; generating at least one corresponding response; forming at least one dialog path by linking one state to at least another one state; detecting and identifying loop in the dialog path and outputting at least a portion of the dialogs in the dialog path. In one embodiment, inputting at least one prompt includes indicating prompt type in the prompt indicator.

While generating at least one corresponding response, the confidence score of the response may be determined. If the confidence score is high, the dialog may proceed to a next state. On the other hand, if the confidence score is moderate or low, the dialog may not proceed, and may be linked to a verifying state to further verify the user's response, or to an error repair state where the user can repeat the response.

While forming at least one dialog path by linking one state to another state, in addition to linking a first state to a second state related to the first state, at least one of the first state and second state is linked to a third state, and/or consequently linked to more states until certain system actions are achieved. Detecting and identifying a loop in the dialog path may help the dialog designer fix inappropriate loops.

For outputting at least a portion of the dialog structure, at least a portion of dialogs in the dialog structure is extracted to the dialog synthesizer as well as to the file as dialog database. In one embodiment, the at least a portion of the dialog structure or the contents in the dialog structure may also be displayed on a display unit.

The above and other aspects, objects and advantages may best be understood from the following detailed discussion of the embodiments.

BRIEF DESCRIPTION OF THE DRAWINGS

FIG. 5B illustrates detail dialogs in the embodiment in FIG. 5A.

FIG. 5E illustrates a dialog path including more than one state in another embodiment.

FIG. 5F illustrates the screen which shows detail dialogs in one specific state in the dialog path in FIG. 5E.

DETAILED DESCRIPTION OF THE PREFERRED EMBODIMENTS

Various embodiments will be described hereinafter with reference to the accompanying drawings. Unless defined otherwise, all technical and scientific terms used herein have the same meaning as commonly understood to one of ordinary skill in the art to which this invention belongs. Although any methods, devices and materials similar or equivalent to those described can be used in the practice or testing of the embodiments are now described. All publications mentioned are incorporated by reference for the purpose of describing and disclosing, for example, the designs and methodologies that are described in the publications which might be used in connection with the presently described embodiments. The publications listed or discussed above, below and throughout the text are provided solely for their disclosure prior to the filing date of the present application. Nothing herein is to be construed as an admission that the inventors are not entitled to antedate such disclosure by virtue of prior invention.

In general, various embodiments of the present invention are related to a dialog design apparatus/tool and method. More specifically, this invention relates to a dialog design apparatus and method to facilitate the writing of natural language dialog and create data structure for voice user interface. Furthermore, the present invention helps the user navigate through all dialog paths including loops, and oversee the entire data structure of the dialog design. Also, the user can easily extract the language data structure and test it with a speech synthesizer.

Figure 1:
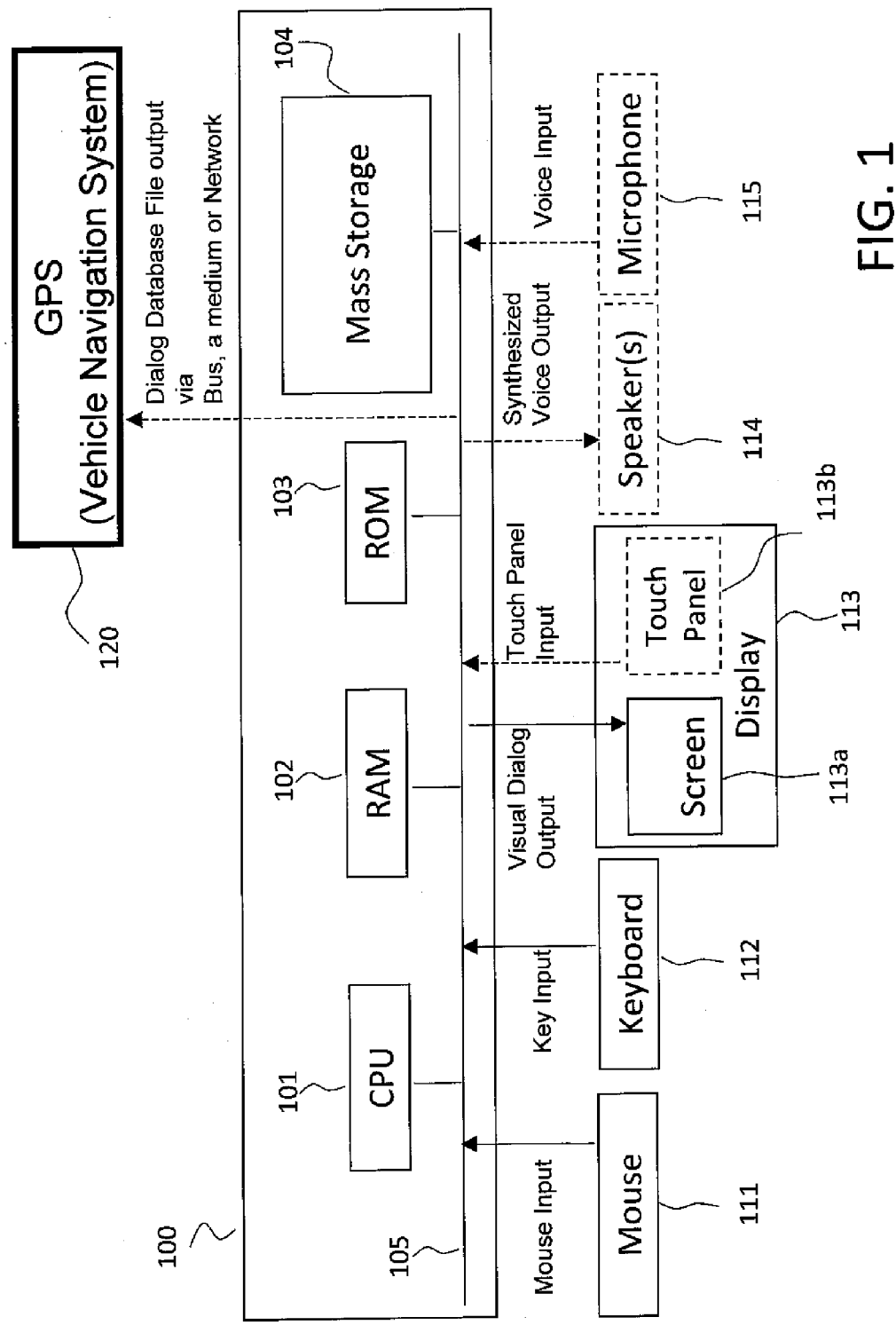
FIG. 1 illustrates a schematic view of a computer system which may be used to implement one embodiment of a state oriented dialog design tool and signal flows around the computer system.

FIG. 1 is a schematic diagram showing one example of a relationship between a computer, such as a personal computer (PC) or workstation (WS) 100 implementing a dialog design tool, and a vehicle navigation system (GPS) 120 implementing a dialog database which is output of the dialog design tool. Note that the schematic diagram in FIG. 1 is a high-level conceptual representation which is not intended to represent any on particular architectural arrangement. For example, the computer 100 includes a central processor unit (CPU) 101, random access memory (RAM) 102, read only memory (ROM) 103, and mass storage 104 each connected by a bus system 105. The bus system 105 may include one or more busses connected to each other through various adapters, controllers, connectors, etc.

One or more external/peripheral devices are coupled to the bus system 105. These external/peripheral devices may include, but not limited to, a mouse 111, a keyboard 112, a display 113 which includes a screen 113a as well as a touch panel 113b, one or more speakers 114 and a microphone 115 for speech input. For example, the mouse 111, the keyboard 112, the touch panel 113b of the display 113 and the microphone 115 may be used to enable the dialog designer to provide inputs to the dialog design tool. In particular, the mouse 11, and the touch panel 113b allows the dialog designer to enter intuitive look and feel input. On the other hand, the keyboard 112 may be used for efficient text entries by the dialog designer. The microphone 115 may be used for the computer 100 to receive natural speech input from the dialog designer. As an output device, the display 113 displays functions of the dialog design tool as well as dialogs on the screen 113a. In addition, one or more speakers 114 may be used for speech output of the dialogs.

The designed dialogs in a format of dialog database file are stored in the mass storage 104. The mass storage 104 may include any device suitable for storing large volumes of data. For example, the mass storage may be a semiconductor-based memory such as a solid state drive (SSD), a magnetic disk such as a hard disk drive (HDD), magnetic optical storage device, or any of various types of optical disks such as digital versatile disk (DVD), compact disk (CD-x) storage, etc. The dialog database file may be transferred to GPS 120 via a bus, a portable medium such as a digital versatile disk (DVD), compact disk (CD-x) storage, USB key drive, or via a network such as internet. The transfer may occur anytime once the dialog database file is finalized.

Figure 2A:
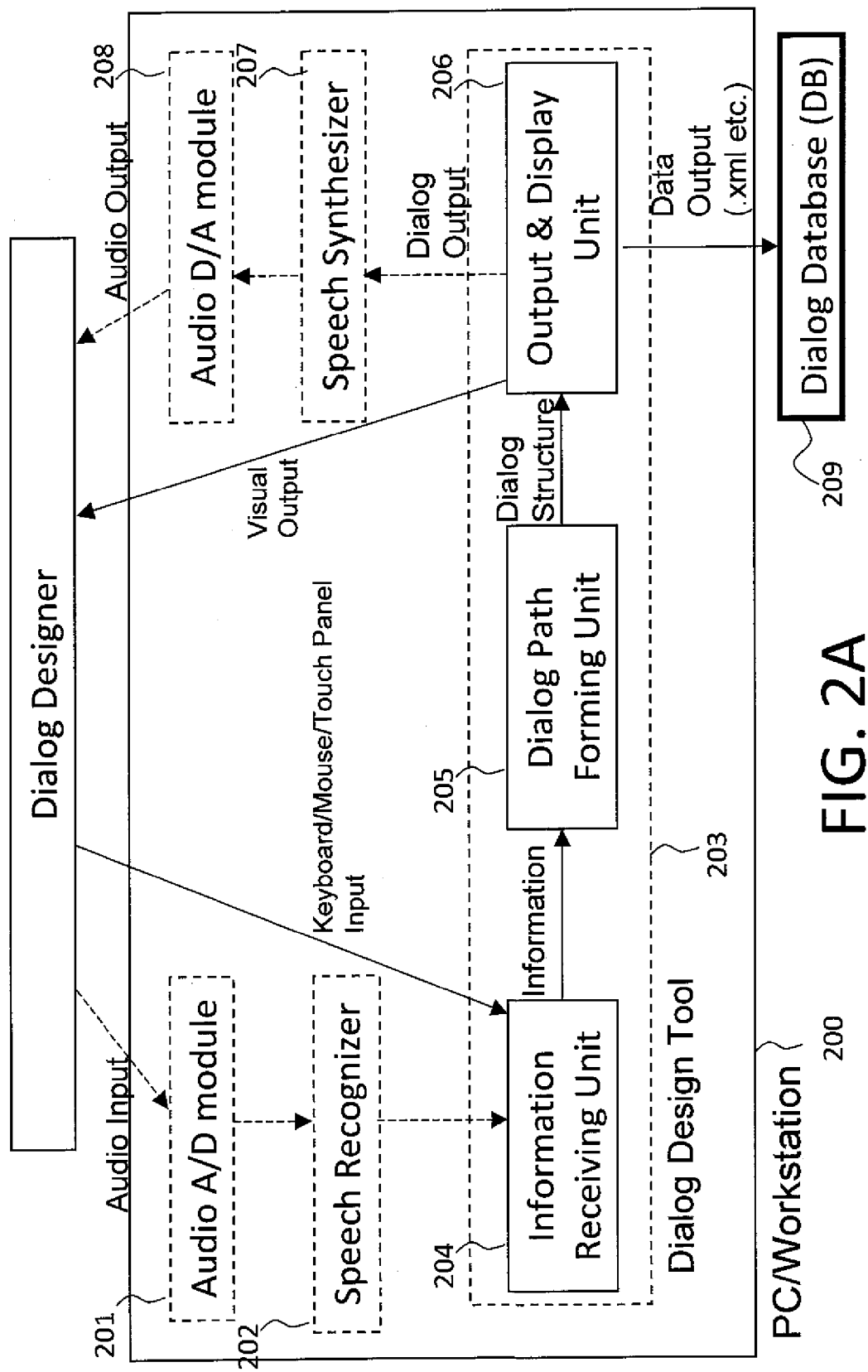
FIG. 2A illustrates a schematic view of one embodiment of a state oriented dialog design tool showing software structure and data flow within and around the tool.

FIG. 2A is a schematic view of one embodiment of a state oriented dialog design tool showing software structure and data flow within and around the tool. On a computer 200, such as a PC or WS, the state oriented dialog design tool 203 is implemented. Input from a dialog designer to the dialog design tool 203 may be received via a keyboard, a mouse or a touch panel as illustrated in FIG. 1. Alternatively, the dialog designer may speak to the computer 200, and the computer 200 receives audio input of the speech via a microphone. The received audio input is analog-to-digital (A/D) converted at an audio A/D module 201, and the converted audio input is sent to a speech recognizer 202. The speech recognizer 202 attempts to recognize the digital audio input and produces the recognition result if recognition is successful.

The dialog designer's input, such as keyboard, mouse, touch panel operations or results of speech recognition, is received at an information receiving unit 204 of the dialog design tool 200, and sent as information to a dialog path forming unit 205. The dialog path forming unit 205 processes the information received at the information receiving unit 204. In particular, the dialog path forming unit obtains at least one dialog structure as a result of processing the received information, and outputs the result to an output and display unit 206. The output and display unit outputs the result as visual output such as one or more images or video to the dialog designer, and as data output to a dialog database 209 which may be in an .xml format, other markup languages or any other database format. Additionally, the output and display unit 206 may generate a dialog output from the result, suitable for playback, and send it to a speech synthesizer 207. Upon receipt of the dialog output, the speech synthesizer 207 synthesizes speech from the dialog output and sends the synthesized speech signal to an audio D/A module 208. The received synthesized speech signal is digital-to-analog (D/A) converted at the audio D/A module 208, and the converted audio output is played back to the dialog designer.

Figure 2B:
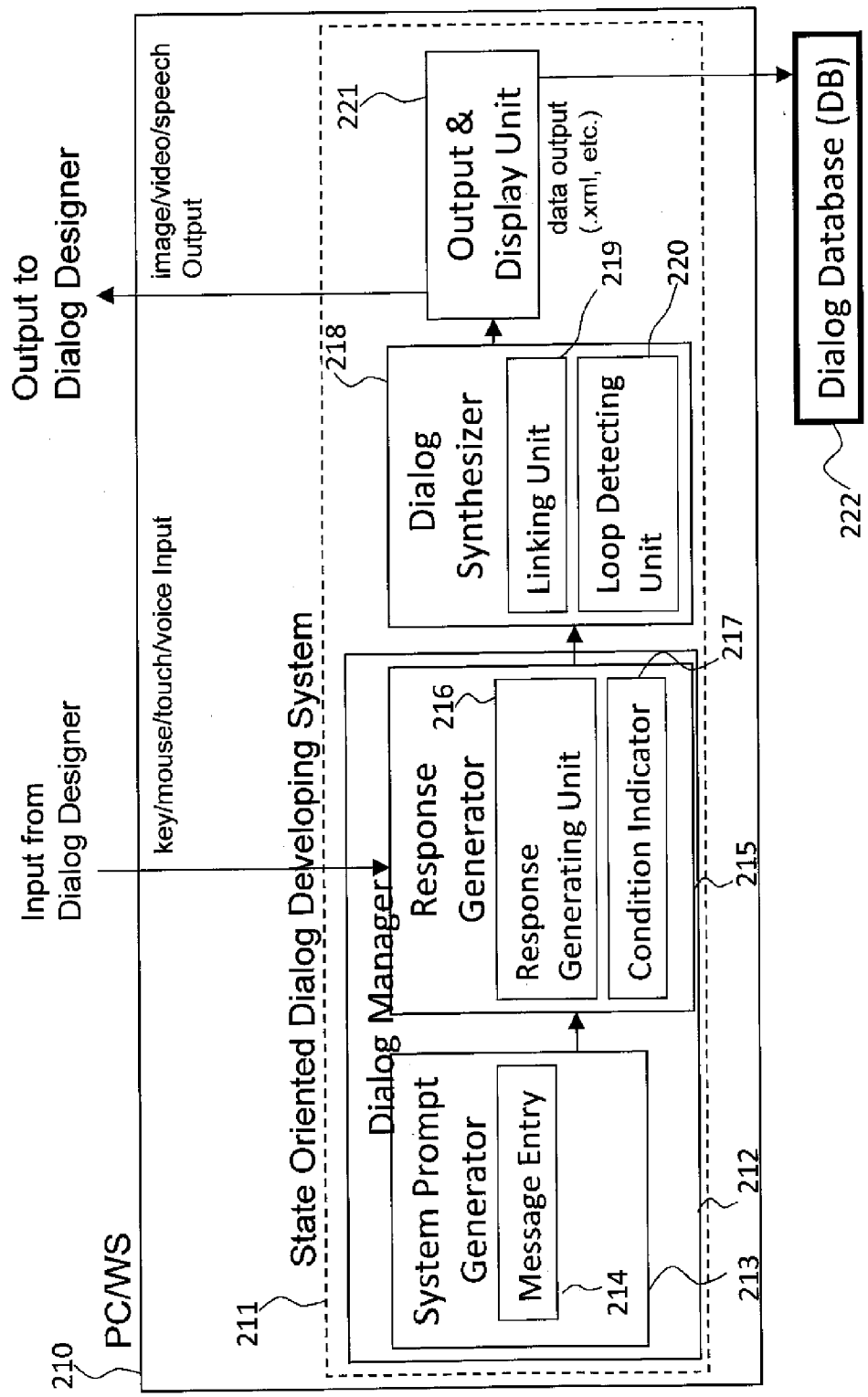
FIG. 2B illustrates a schematic view of one embodiment of a state oriented dialog design system showing software structure of dialog developing process.

FIG. 2B illustrates a schematic view of one embodiment of a state oriented dialog design system showing software structure of dialog developing process. On a computer 210, such as a PC or WS, a state oriented dialog design system 211 is implemented. The state oriented dialog design system 211 includes a dialog manager 213 which may manage generation of system prompts and responses, a dialog synthesizer 217 which handles composition of a dialog structure, and an output and display unit 221 which handles outputting results to a dialog designer as well as external devices in a form of a dialog database which is served as the database on a vehicle navigation system. In the dialog manager 211, a system prompt generator 213 includes a message entry 214 and a response generator 215. The response generator 215 may receive an input from a dialog designer to the state oriented dialog design system 211. According to the input, a response is generated in a response generating unit 216. Furthermore, the response generator may include a condition indicator 217 which indicates the likelihood that the system correctly interpreted the language spoken by the user. A confidence score may be used indicate such likelihood, but any other statistical indicator may be used to assist the dialog designer to decide whether the generated response is suitable.

A dialog synthesizer 218 receives the generated response from the response generator 216 corresponding to the system prompt from the system prompt generator 214. In the dialog synthesizer 218, a linking unit 219 and a loop detection unit 220 are included. Upon receipt of the generated response, the linking unit 219 links one state to at least one another state structurally in order to form a dialog path. Furthermore, the dialog synthesizer may compile at least one dialog path into a dialog structure at the linking unit 219. The loop detecting unit 220 detects and identifies one or more loops in the dialog structure. The dialog structure is received at an output and display unit 221 so that the at least a portion of the dialog structure can be provided to the dialog designer as image/video output as well as a file storing the dialog structure as a dialog database 222.

Figure 2C:
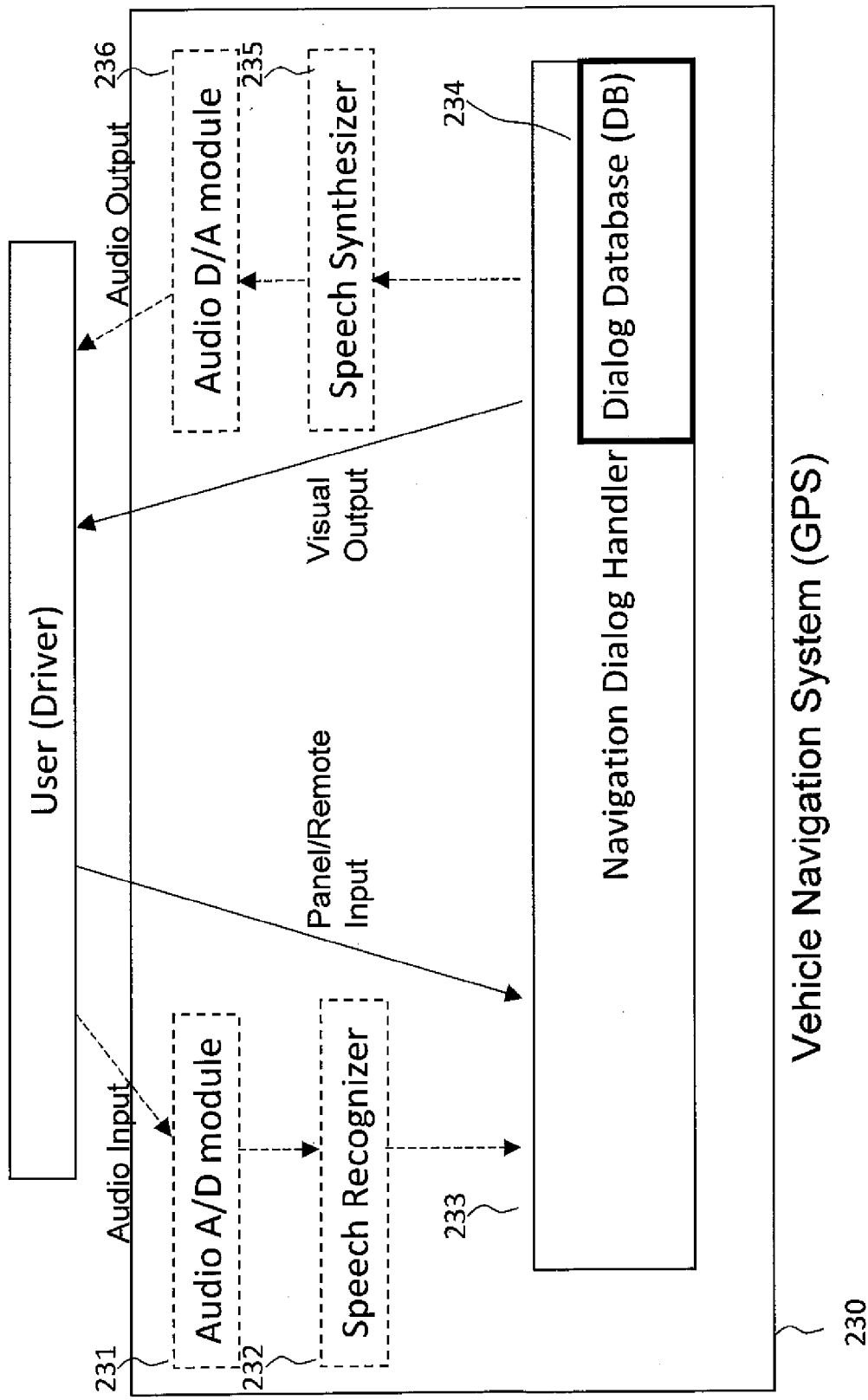
FIG. 2C illustrates a schematic view of one embodiment of a vehicle navigation system (GPS) showing software architecture using the dialog database in FIGS. 2A-2B.

FIG. 2C illustrates a schematic view of one embodiment of a vehicle navigation system 230 showing software architecture using the dialog database. On the vehicle navigation system 230, an input from a user, which may be a driver, may be received via a touch screen, front panel or remote controller as illustrated in FIG. 2C. Alternatively, the user may speak to the vehicle navigation system 230, and the vehicle navigation system 230 receives audio input of the speech via a microphone. The received audio input is analog-to-digital (A/D) converted at an audio A/D module 231, and the converted audio input is sent to a speech recognizer 232. The speech recognizer 232 attempts to recognize the digital audio input and produces the recognition result if recognition is successful. The user's input, such as touch screen, front panel or remote controller operations or results of speech recognition, is received at a navigation dialog handler 233. The navigation dialog handler 233 uses the dialog database 234 installed on the navigation dialog handler 233, and generated by the dialog design tool of 203 in FIG. 2A or a state oriented dialog developing system in FIG. 213, and provides output to the user. The output may be visual output such as one or more images or video, or a dialog output suitable for audio playback. The dialog output is sent to a speech synthesizer 235. Upon receipt of the dialog output, the speech synthesizer 235 synthesizes speech from the dialog output and sends the synthesized speech signal to an audio D/A module 236. The received synthesized speech signal is digital-to-analog (D/A) converted at the audio D/A module 236, and the converted audio output is played back to the user.

Figure 3:
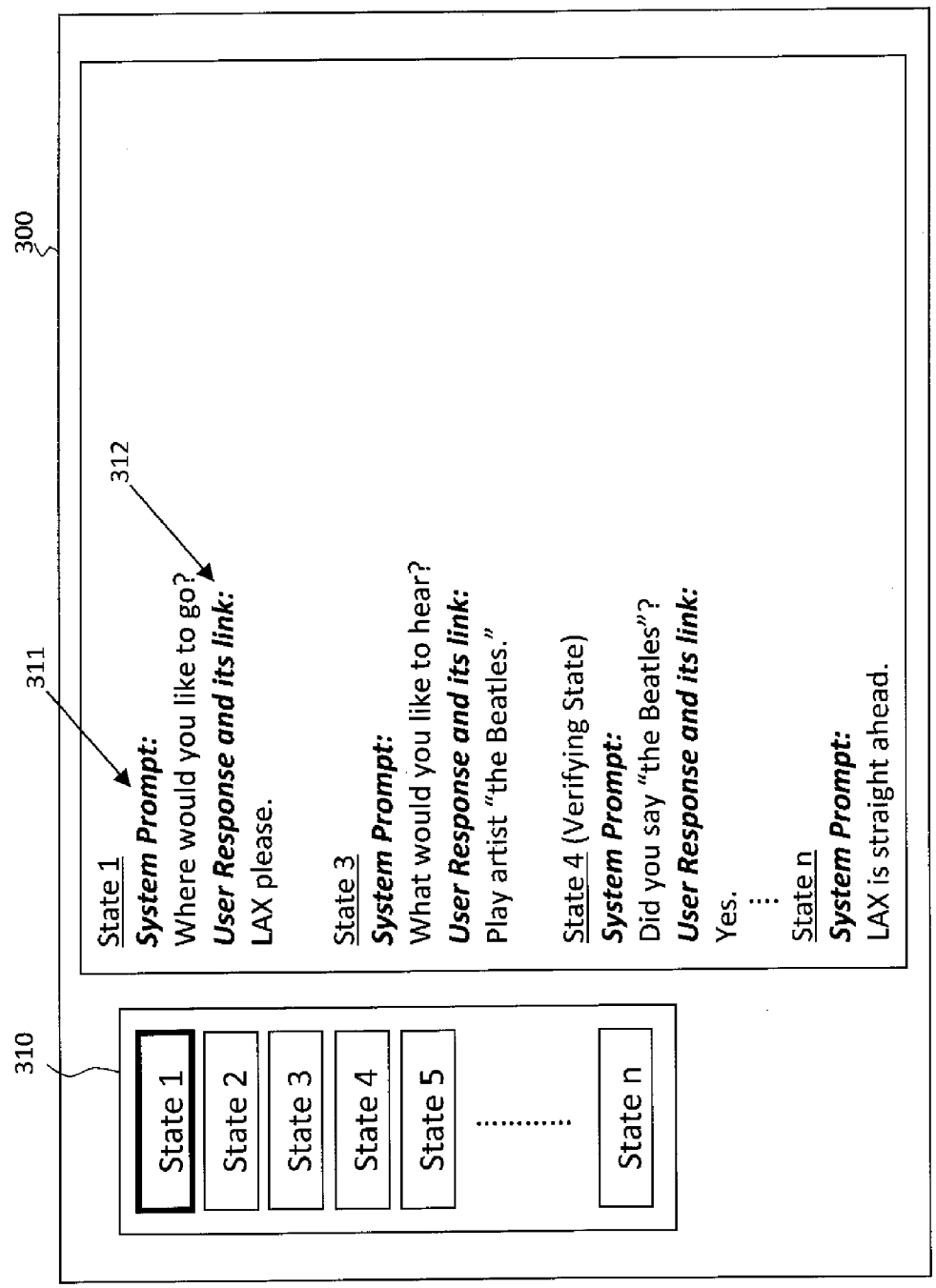
FIG. 3 illustrates a schematic view of a state oriented dialog design tool in one embodiment, illustrating multiple states and descriptions according to the multiple states.

Referring to FIG. 3, a state oriented dialog design tool is described in more details. Generally, a state oriented dialog tool is managed to collect three kinds of information to define a dialog. First, there is information about states. States have prompts, possible user responses, and possible system actions to the responses. Secondly, there is information about prompts for the states. Third, there is information about variables. Some system actions can be achieved by a single state, while certain system actions may be achieved by combining more than one state. A screen of a state oriented dialog design tool 300 may include a state list 310 including at least one state used in designing the dialog, and each state may have at least one system prompt section 311 and at least one user response section 312. The system prompt section 311 is adapted to initiate conversation with the user, while the user response section 312 is designed by the dialog designer to anticipate the user's answer for possible system actions. In one embodiment, the user response section 312 may include more than one state based on the user's response, and each state is linked by a dialog path forming unit 205 shown in FIG. 2A.

As can be seen in FIG. 3, after the dialog design tool 300 receives the anticipated destination response from the user to the airport (LAX) in State 1, dialog path forming unit 205 shown in FIG. 2A may link State 1 to one of the states associated with the enjoyment while driving, such as music playing in State 3. The dialog path forming unit 205 shown in FIG. 2A may further link State 3 to State 4 to verify the user's response in State 3, and link State 4 to at least one more state until the user reaches the destination, for example, in State n.

Figure 4A:
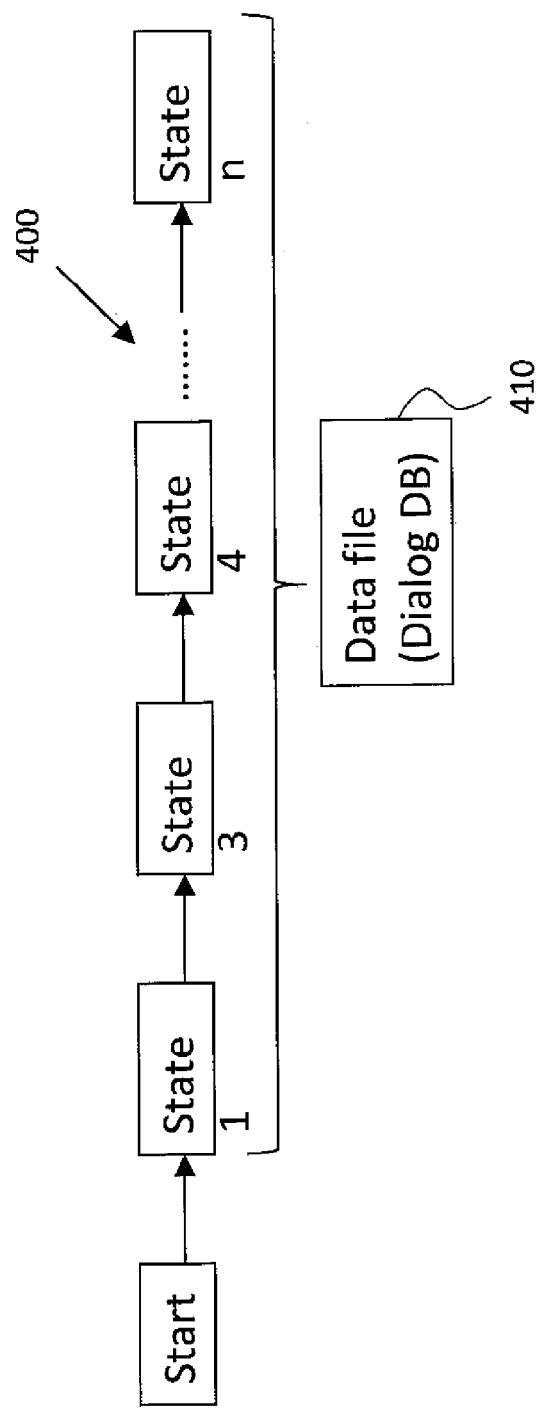
FIG. 4A illustrates a dialog path with at least one dialog path and a schematic view of a data file (dialog database) in one embodiment.
Figure 4B:
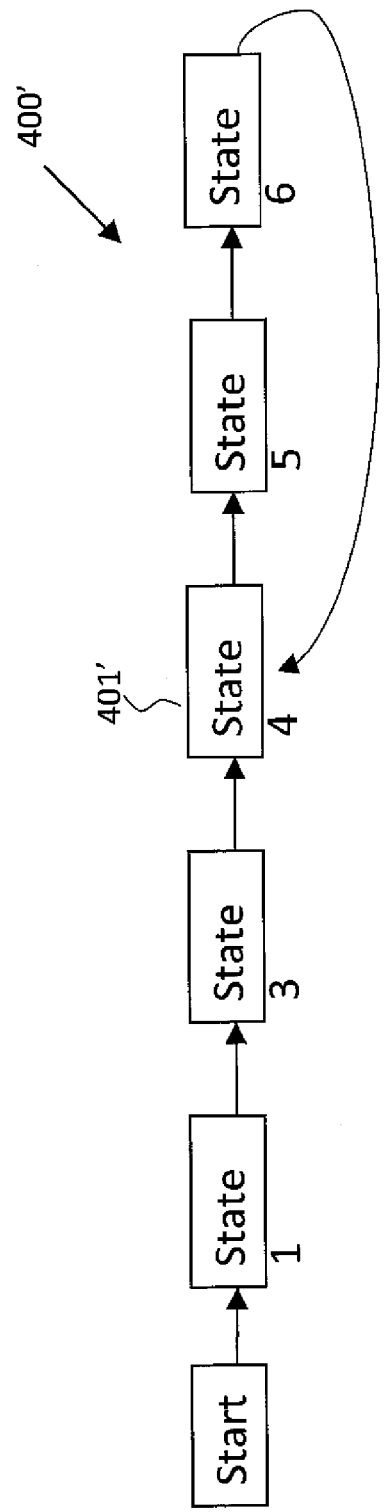
FIG. 4B illustrates a dialog path including at least one loop therein.

A dialog path 400 in FIG. 4A can be created according to the dialogs depicted in FIG. 3, wherein a system action, e.g. taking the user to the airport, is achieved by combining more than one state. In one embodiment, the combination of the associated states is considered a "data file" 410 which can be partially or entirely extracted and tested with a speech synthesizer. In another embodiment, the data file can facilitate translation from one language to another language.

As discussed above, a "loop" is a common problem in dialog design, meaning that the dialog path does not proceed to the desirable end results, but keeps "looping" back to one or more previous states. For example, in a dialog path 400' in FIG. 413, the dialog keeps looping back to "State 4" 401' in the dialog flow. This may happen when the "State 4" 401' is a verifying state which is generally used to verify the user's response before proceeding to the next state. On the other hand, the loop may occur when the dialog designer makes some mistakes when designing the dialogs.

Figure 5A:
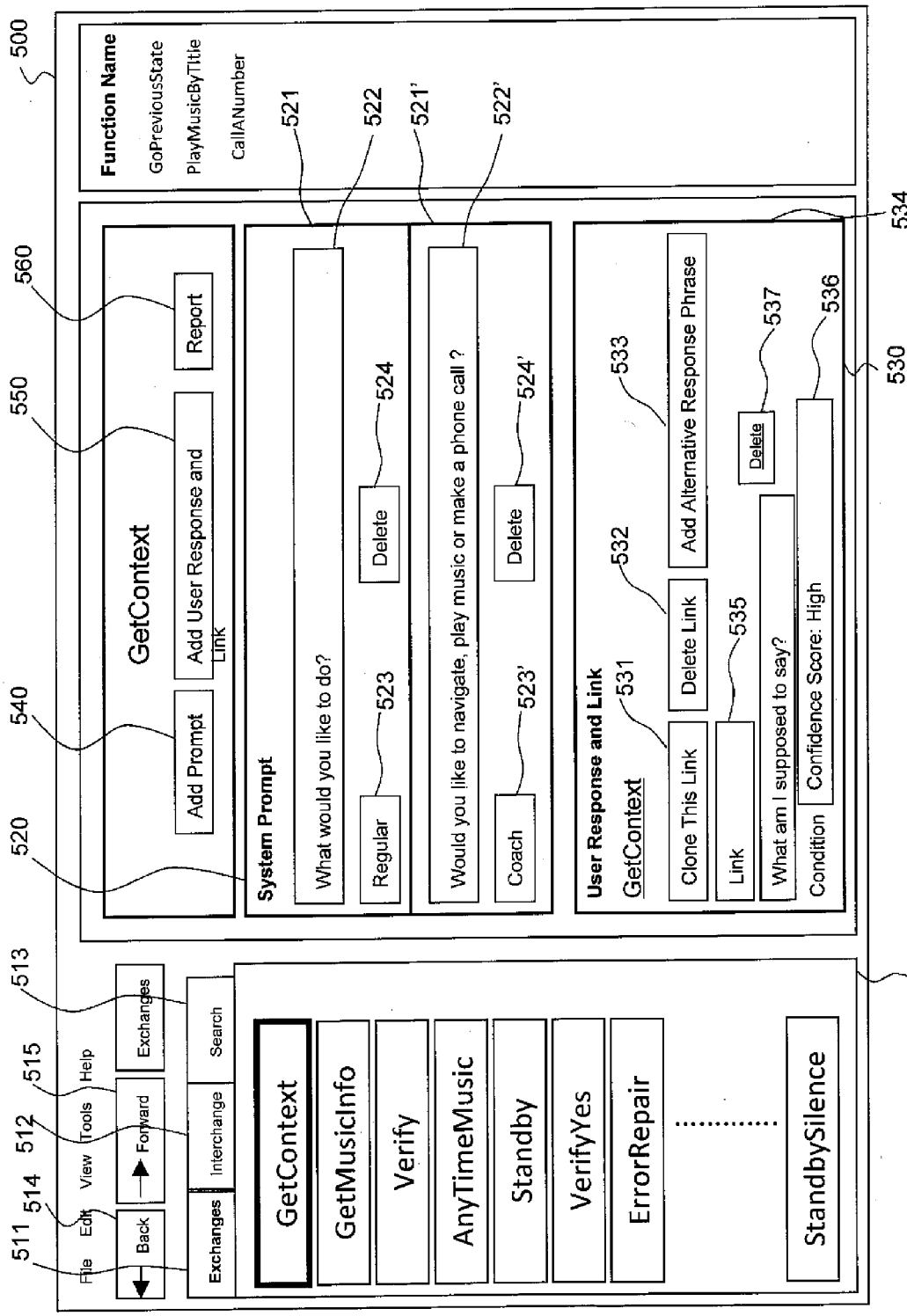
FIG. 5A illustrates a screenshot of one state in one embodiment of a state oriented dialog design tool.

Referring to FIG. 5A, a dialog design system 500 in one embodiment may include a state list 510 including a system prompt section 520 and a user response and link section 530. The system 500 further includes a prompt adding button 540, a response and link adding button 550, a report button 560. The state list 510 may include at least one state used in the dialog. In one embodiment, the dialog may include more than one state connecting with each other to achieve certain system actions.

The system prompt section 520 may include one or more prompt unit 521, 521' including a message input area 522, 522', a prompt indicator 523, 523' and a delete button 524, 524'. The message input area 522 allows the designer to input a system prompt which may include more than one message as shown in FIG. 5A. The prompt indicator 523 is used to indicate whether the message inputted by the designer is a regular question, a hint or a coaching style question. For example, a message such as "What would you like to do?" indicated in the message input area 522 is considered a regular question while a message such as "Would you like to navigate, play music, make a phone call or control the climate in your car?" indicated in the message input area 522' is considered a coaching style question. In addition, the delete button 524 is used to delete the system prompt message while the prompt adding button 540 is adapted to create the prompt unit 521 in the system prompt section 520.

The user response and link section 530 includes at least one state where the dialog designer can create anticipated responses as to the questions in the system prompt 520. Each state may include a link cloning button 531, a link delete button 532 an alternative response adding button 533 and a response input area 534. The user response and link section 530 may further include a linking button 535 which activates a linking unit 220 in a dialog synthesizer 218 as shown in FIG. 2B to link a first state to a second state related to the first state, link the second state to a third state (related to the first or the second state, or both), and so on until certain system actions are achieved. The link cloning button 531 is used to duplicate one specific state (with identical response and condition) and attach the state to the end of the response and link section 530, while the link delete button 532 deletes one specific state in the response and link section 530.

The response input area 534 allows the dialog designer to input anticipated answers corresponding to the questions in the system prompt. The response can be deleted by clicking a response delete button 537. The response and link section 530 may further include a condition indicator 536 to indicate the likelihood that the system correctly interpreted the language spoken by the user. As illustrated above, a "confidence score" (CS) may be used in the condition indicator 536. If the confidence score is high (High CS), namely the user's response is likely to be correctly interpreted by the dialog design system 500, the linking button 535 will activate a linking unit 220 in a dialog synthesizer 218 as shown in FIG. 2B to link the current state to the next state based upon the response. On the other hand, if the confidence score is moderate (Mod CS) or low (Low CS), the linking button 535 may link the current state to a verifying state or an error repairing state to have the user input the response again until the confidence score becomes high.

The response and link adding button 550 adds a blank state attaching at the end of the user response and link section 530 for the designer to input more responses. Moreover, the report button 560 enables the designer to overview the entire dialog in each state. Once the designer clicks on the report button 560, the dialogs in detail are shown as a dialog overview as illustrated in FIG. 5B, according to the "GetContext" state illustrated in FIG. 5A. This overview may be particularly helpful when the designer fixes complicated dialogs if necessary.

Still referring to FIG. 5A, the dialog design system 500 may include a plurality of status tabs are located above the state list 510. The status tabs include an exchange tab 511, an interchange tab 512 and a search tab 513. In the exchange status 511, when the designer selects different states in the state list 310, the entire dialogs in each state are displayed. For example, FIG. 5B illustrates the entire dialogs for the "GetContext" state.

Figure 5C:
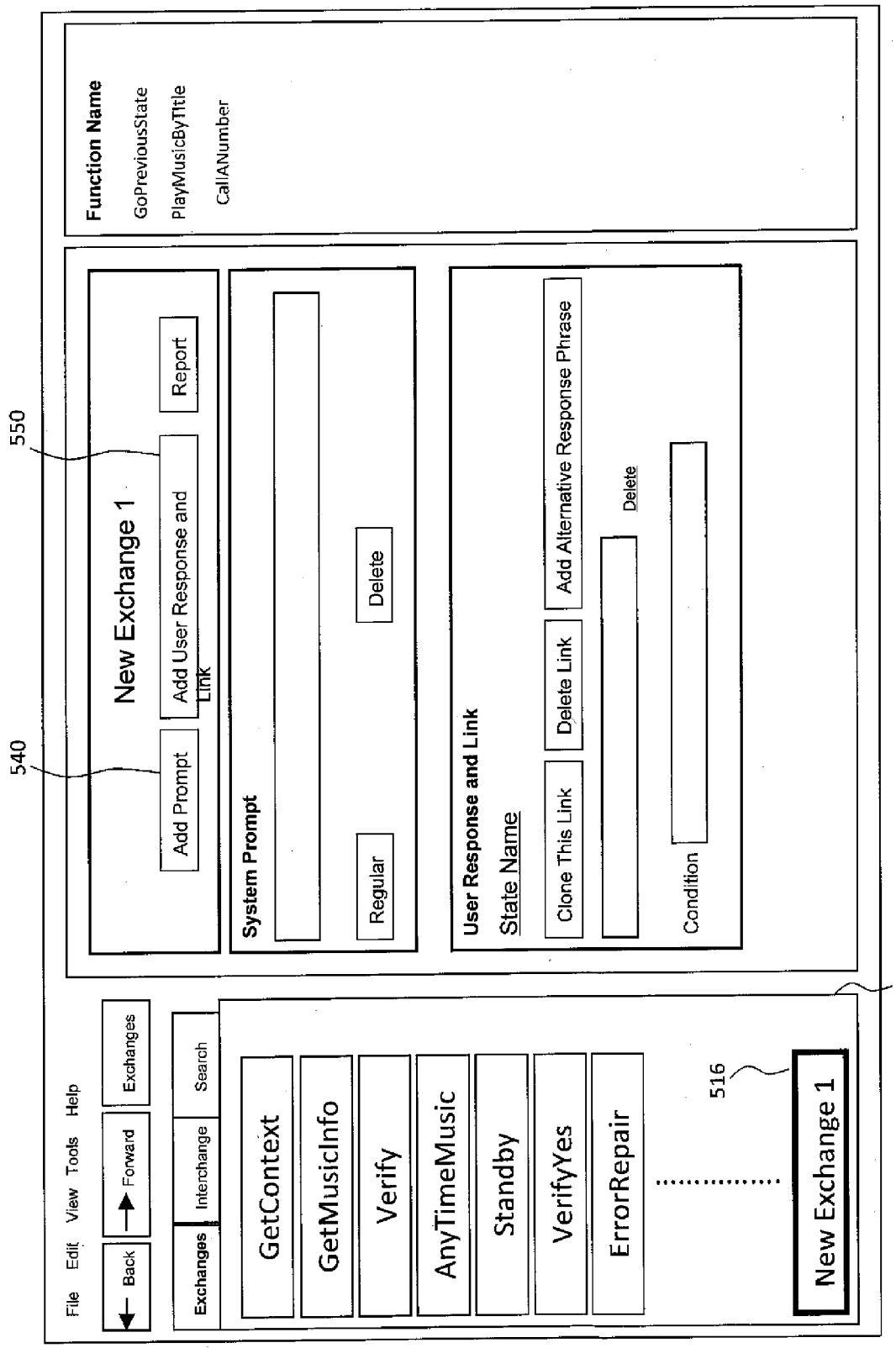
FIG. 5C illustrates a screenshot of adding a new state in the embodiment in FIG. 5A.

In addition to looking into the dialogs in each state, as illustrated in FIG. 5C, the designer can also create a new state 516 in the state list 510 wherein the designer can input system prompts and anticipated user responses by starting from the prompt adding button 540 and the response and link adding button 550, as shown in FIG. 5C. The designer can also rename the new state 516 if necessary.

Figure 5D:
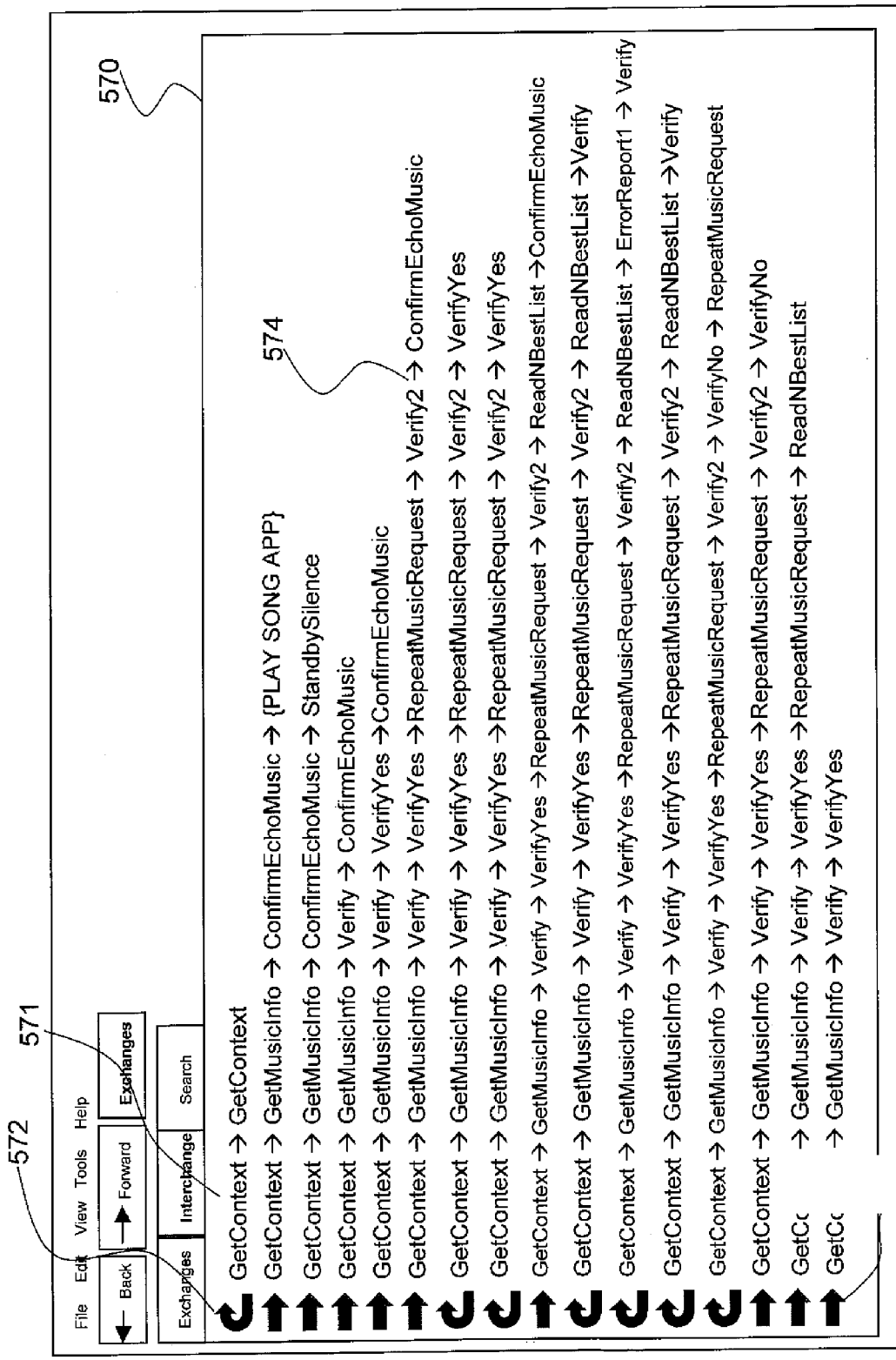
FIG. 5D illustrates a dialog structure including more than one dialog path, starting from the specific state in FIG. 5A.

Referring back to FIG. 5A, the interchange tab 512 provides a structural overview of the dialogs in each state any time during the process of the dialog design. The designer may have to specify a starting state before receiving such overview information. As depicted in FIG. 5D, for instance, the structural overview 570 starts from the "GetContext" state 571. In one aspect, the structural overview 570 is simply a combination of a plurality of the dialog path generated by the dialog path forming unit. In addition, at least a portion of the dialog structure in the structural overview 570 can be considered a "data file" which can be extracted and tested with a speech synthesizer.

As discussed above, sometimes the loop occurs to verify the user's response, but sometimes the loop occurs due to the user or designer's mistake. Furthermore, if the dialog path is complicated, it is difficult for the dialog designer to discover the loop. The dialog system further includes a loop detecting unit to detect and identify loop(s) in dialog paths to help the dialog designer fix inappropriate loops. Referring to FIG. 5D, if the loop detecting unit indicates that the dialog path has a loop, a loop indicator 572 is placed in front of the dialog path. On the other hand, if the dialog ends properly without loop, an arrow sign 573 is placed in front of the dialog path.

Figure 5G:
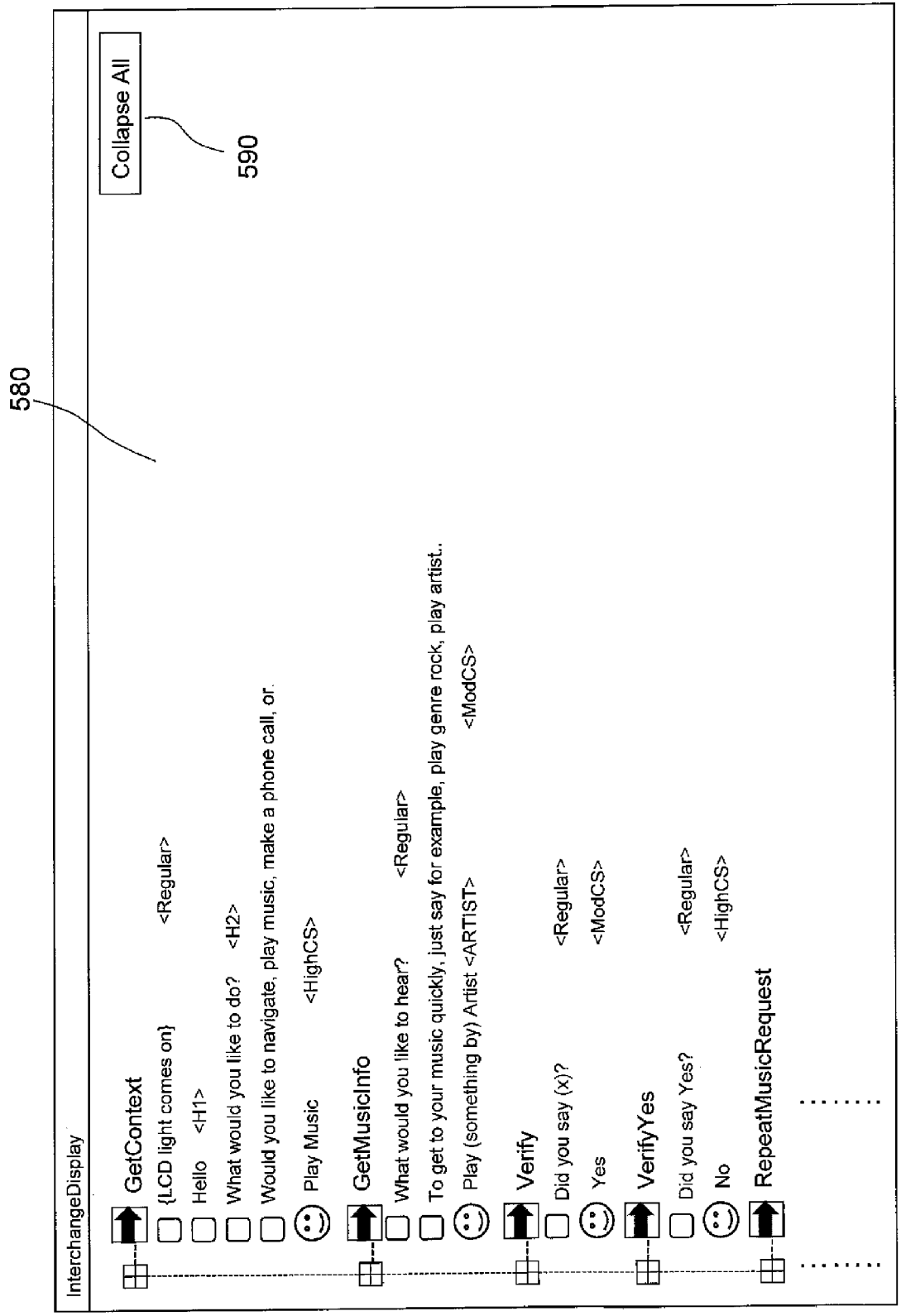
FIG. 5G illustrates the screen which shows detail dialogs in every state in the dialog path in FIG. 5E.

In addition to providing structural overview of the entire dialog and detecting loops in the dialog path, one embodiment allows the dialog designer to look into each dialog path to retrieve the contents therein. As shown in FIGS. 5D and 5E, when the designer double clicks a dialog path 574, a state display window 580 is shown in which each state in the dialog path 574 is listed. The designer can further double click on any of the listed states to retrieve detail dialogs therein. For instance, if the designer double clicks on the "GetContext" state 571, the entire dialog is displayed as illustrated in FIG. 5F. The state display window 580 includes an "Expand All" button 581 adapted to display detail dialogs in each state simultaneously. Once the designer double clicks on the "Expand All" button 581, detail dialogs of each state are displayed as FIG. 5G. The state display window 580 also includes a "Collapse All" button 590 in FIG. 5G to collapse all detail dialogs to each state and restore the state display window 580 to the status in FIG. 5E.

Figure 6A:
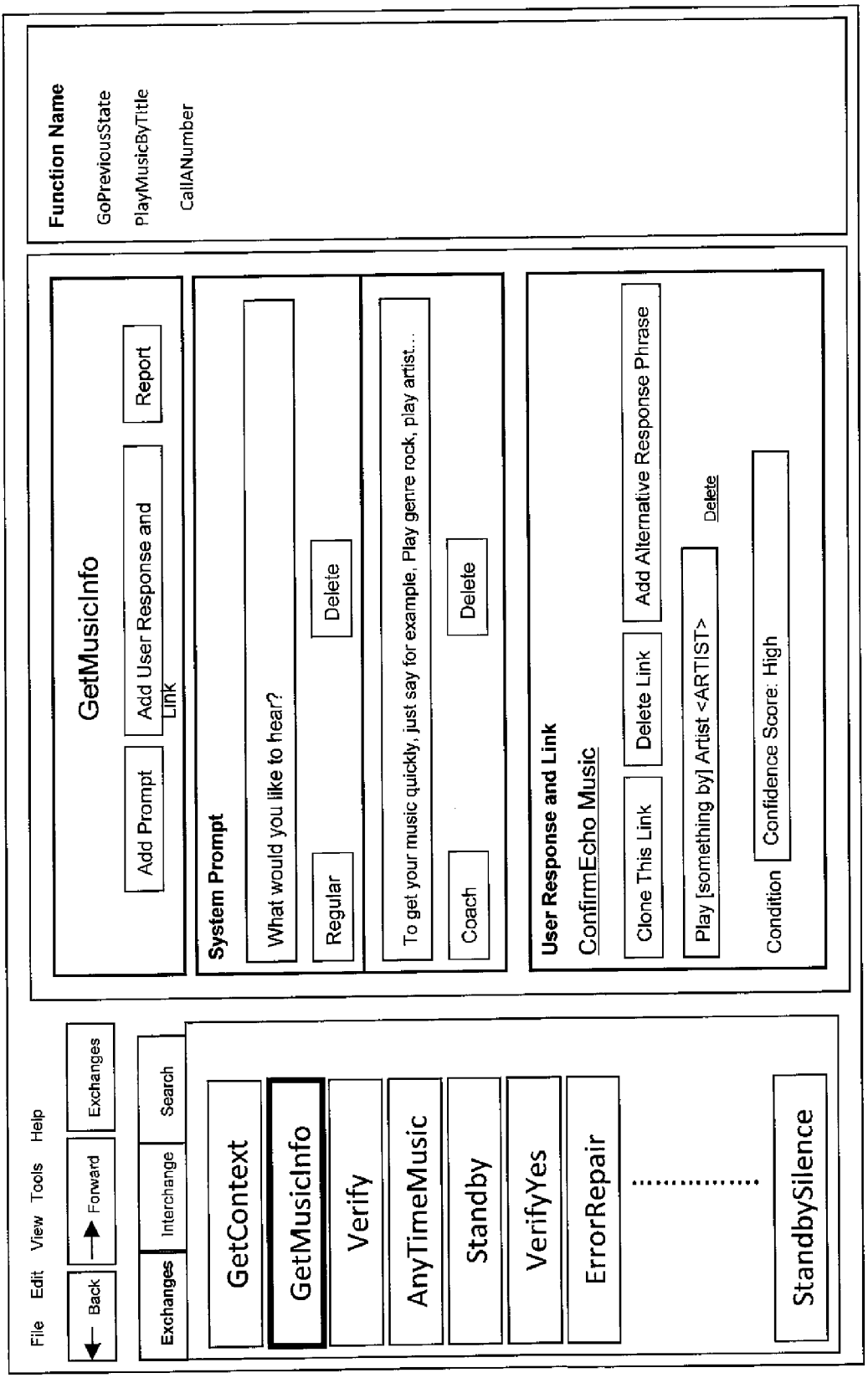
FIG. 6A illustrates a screenshot of another state of the embodiment of the state oriented dialog design tool.
Figure 6B:
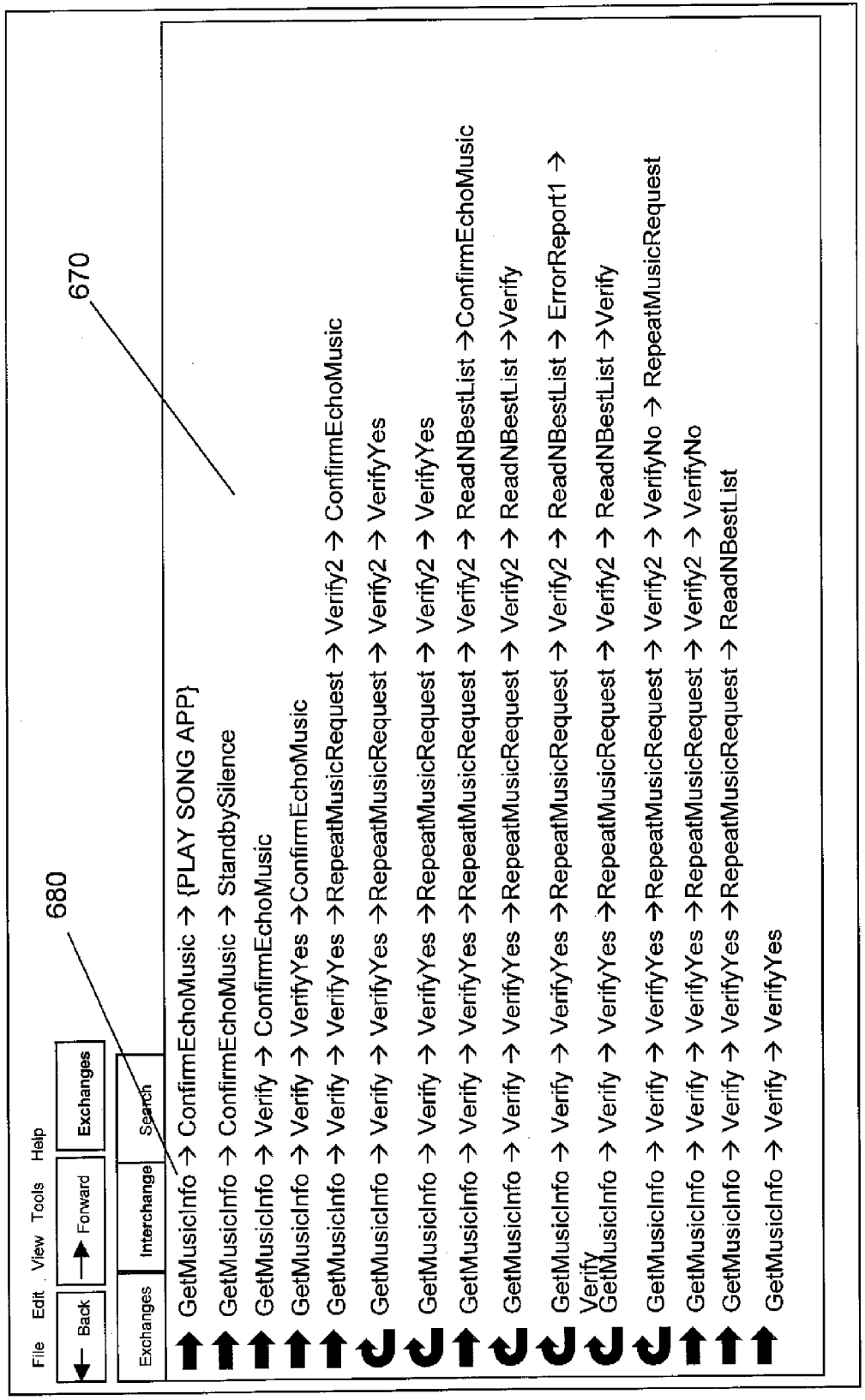
FIG. 6B illustrates another dialog structure including more than one dialog path, starting from the state in FIG. 6A.

Corresponding to another state, such as the "GetMusicInfo" state, as illustrated in FIG. 6A, the structural overview 670 may start from the state 680 "GetMusicInfo" in FIG. 613.

Figure 7A:
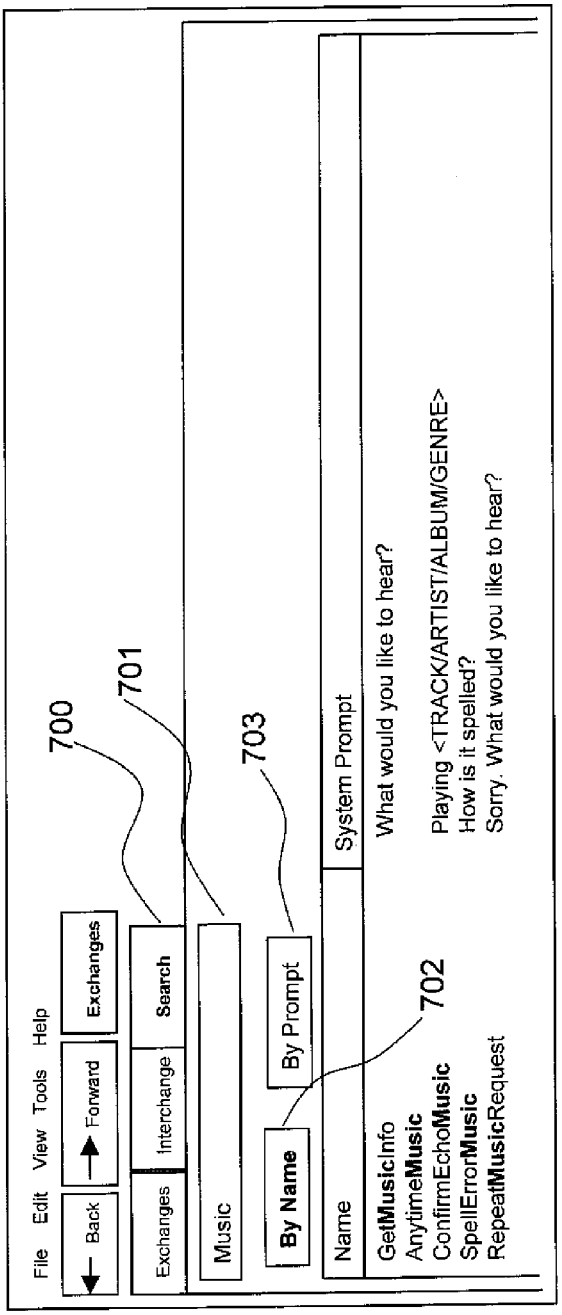
FIGS. 7A and 7B illustrate a search function (either by state name or by prompt).
Figure 7B:
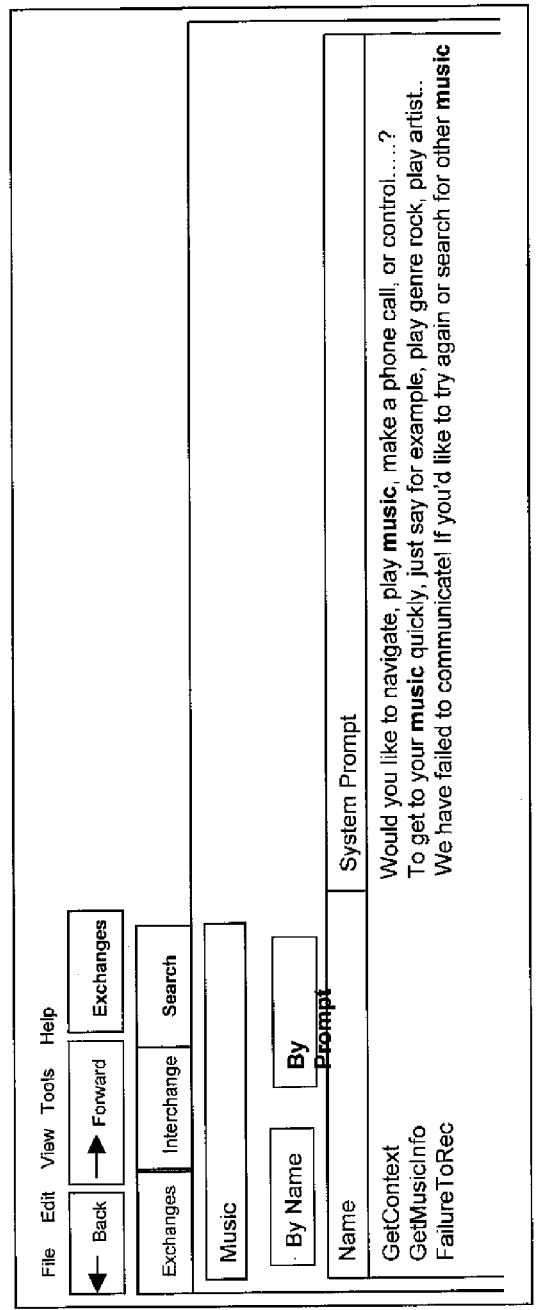

Another embodiment may include a search function. As illustrated in FIG. 7A, the search tab 700 provides a key word search function to the dialog designer. More specifically, the designer can perform a key word search either "By name" (of the state) 702 or "By prompt" 703. For example, when the designer inputs the key word "music" in a search word field 701, the system starts searching for the key word "music" either appearing in the state name or in the system prompt. The search results are displayed as illustrated in FIGS. 7A and 7B, respectively.

Figure 8A:
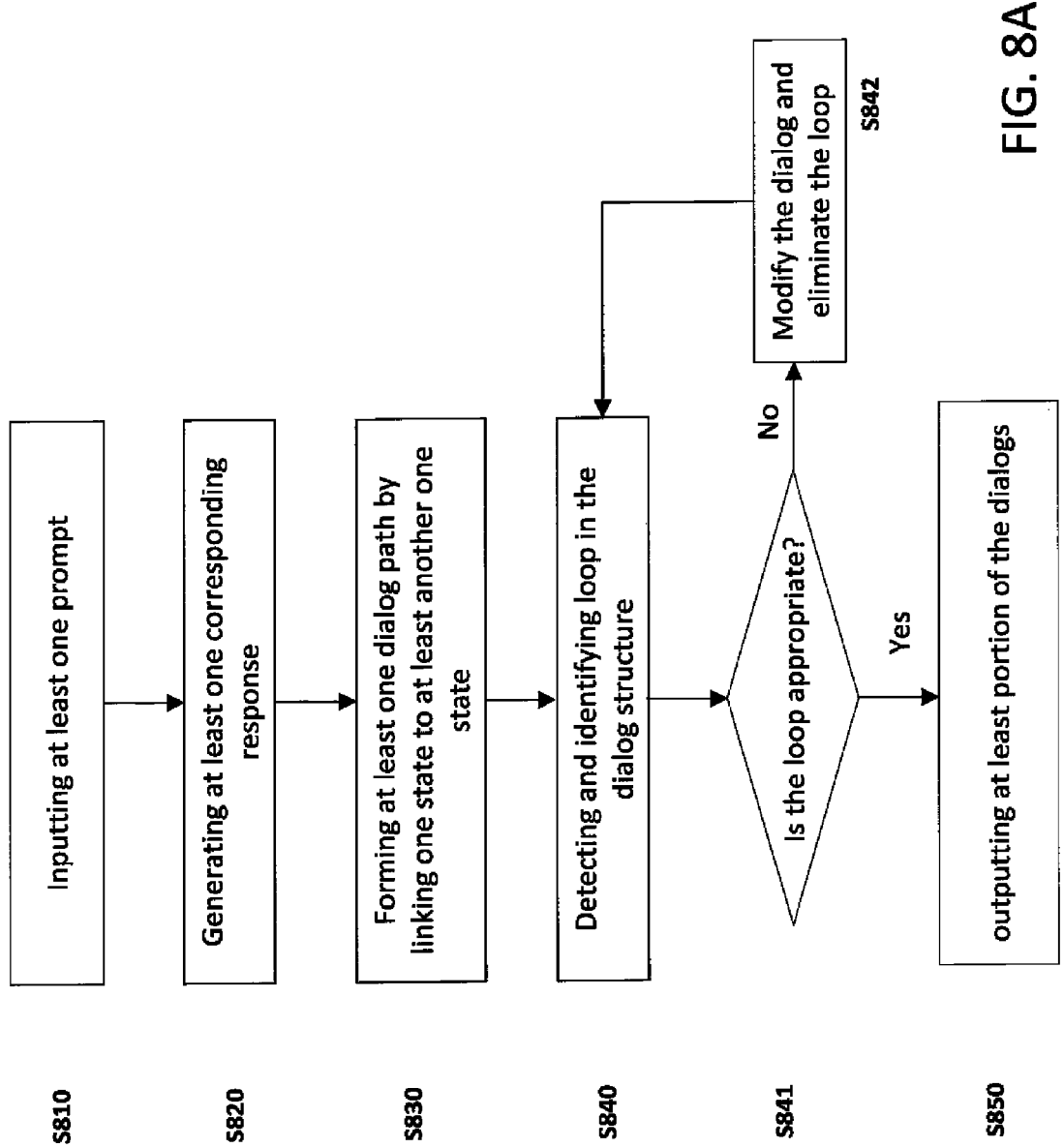
FIG. 8A illustrates a flowchart regarding one embodiment of a method of developing dialogs.

In another aspect according to FIG. 8A, a method of developing dialogs includes: inputting at least one prompt S810; generating at least one corresponding response S820; forming at least one dialog path by linking one state to at least another one state S830; detecting and identifying the loop in the dialog structure S840; and outputting at least a portion of the dialogs S850. The step of inputting at least one prompt S810 includes a step of indicating prompt type in the prompt indicator 523 in FIG. 5A. The step of inputting at least one prompt S810 may further include a step of adding the prompt unit 521 in the system prompt section 520 in FIG. 5A for the designer to enter new prompt.

The step of generating at least one corresponding response 820 includes a step of including at least one state where the dialog designer can create anticipated responses as to the questions in the system prompt 520 in FIG. 5A. The step 820 may further include a step of determining the confidence score in the condition indicator 536 in FIG. 5A.

The step of forming at least one dialog path by linking one state to another state 830 includes a step of linking a first state to a second state related to the first state, linking the second state to a third state (related to either the first or the second state, or both), and so on until certain system actions are achieved.

Still referring to FIG. 8, the step of detecting and identifying loop in the dialog structure 840 in the dialog paths helps the dialog designer fix inappropriate loops. As discussed above, the dialog path may need some loops to confirm the speaker's response. If the loop is considered appropriate in the step determining the appropriateness of the loop 841, the dialog structure can be outputted at least in some portions according to the need of the designer as illustrated as shown in the outputting step 850. On the other hand, the designer may have to modify the dialog as shown in the modifying step 842 if the loop is considered inappropriate in the determining step 841.

In one embodiment of step 850, the step of outputting at least a portion of the dialogs may include a step of providing the structural overview of the entire dialog to the designer. Furthermore, as illustrated in FIGS. 5D-5F, the structural overview may include at least one dialog path and the designer can look into each dialog path to retrieve the contents therein.

Figure 8B:
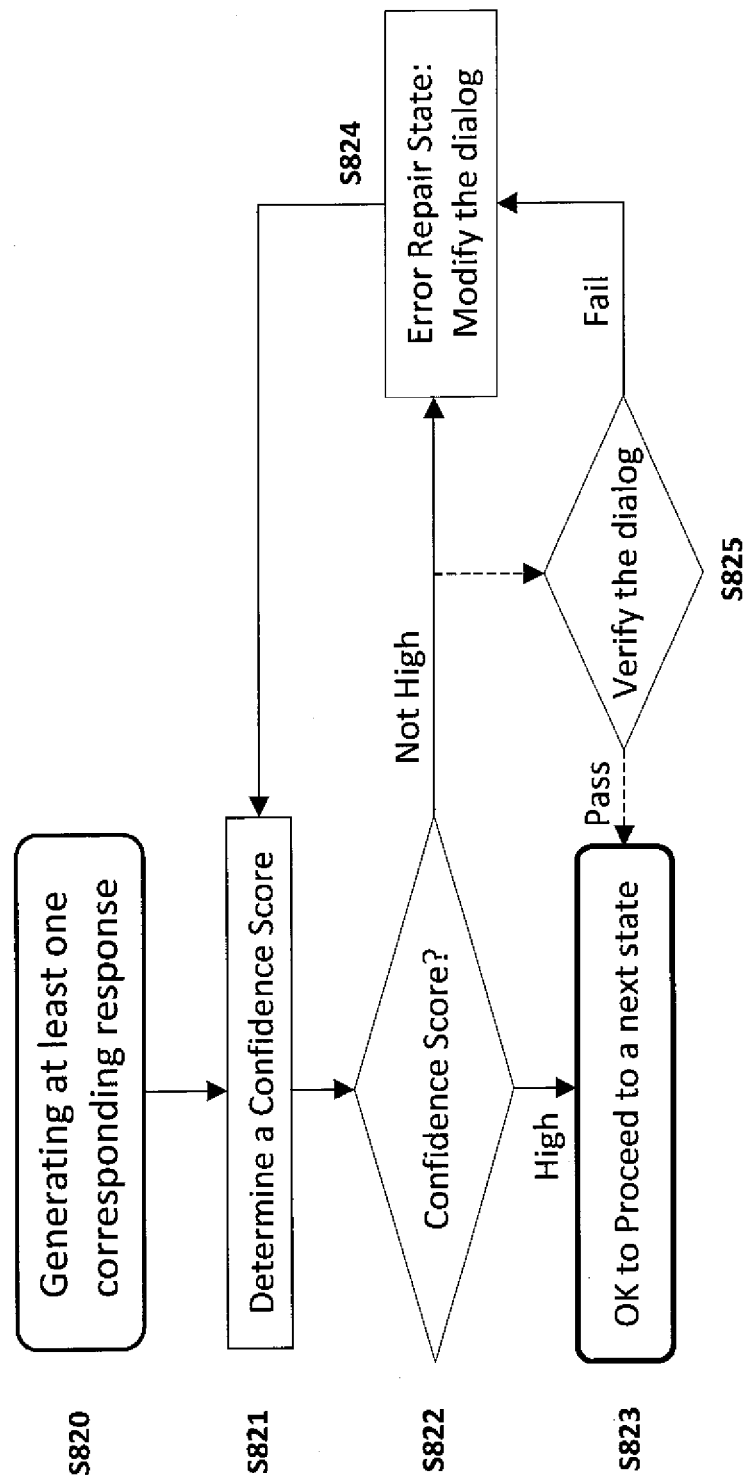
FIG. 8B illustrates a flowchart showing one embodiment of generating a response in the method of developing dialogs.

In another embodiment, as illustrated in FIG. 8B, while generating at least one corresponding response, the confidence score of the response may be determined. If the confidence score is high, the dialog may proceed to a next state. On the other hand, if the confidence score is moderate or low, the dialog may not proceed, and may be linked to a verifying state to further verify the user's response, or to an error repair state where the user can repeat the response.

In another embodiment, while forming at least one dialog path by linking one state to another state, in addition to linking a first state to a second state related to the first state, at least one of the first state and second state is linked to a third state, and/or consequently linked to more states until certain system actions are achieved. Detecting and identifying a loop in the dialog path may help the dialog designer fix inappropriate loops.

For outputting at least a portion of the dialog structure, at least a portion of dialogs in the dialog structure may be extracted to the dialog synthesizer as well as to the file as dialog database. In one embodiment, the at least a portion of the dialog structure or the contents in the dialog structure may also be displayed on a display unit. This outputting may occur any time according to a request from the dialog designer, and the output can be produced in any unit. For example, the output can be produced after each dialog path linking a combination of a prompt and a response is generated. Alternatively, the output may be generated during the dialog design session in an interactive mode. In this mode, once the dialog design tool synthesizes a system prompt regarding a situation, a dialog designer produces a response which is recognized by a speech recognizer, and the tool further synthesizes upon the recognized response, and this procedure continues until the dialog design tool determines that the session is completed or the dialog designer decides to end the dialog design session. In another embodiment, the dialog design tool may output a dialog structure in a continuous manner to produce a larger chunk of database. The output database may be used for further evaluation which allows the dialog design tool to automatically detect one or more errors in the dialog structure while reviewing the dialogs structure in text database. Alternatively, in another embodiment, the dialog design tool may output a dialog structure in a continuous manner to produce at least one audio file the at least one audio file may allow the dialog designer to evaluate naturalness of the dialog by listening to the dialogs in the at least one audio file.

Although this invention has been disclosed in the context of certain preferred embodiments and examples, it will be understood by those skilled in the art that the inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combination of the specific features and aspects of the embodiments may be made and still fall within the scope of the inventions. It should be understood that various features and aspects of the disclosed embodiments can be combined with or substituted for one another in order to form varying mode of the disclosed invention. Thus, it is intended that the scope of at least some of the present invention herein disclosed should not be limited by the particular disclosed embodiments described above.

The invention claimed is:

1. A dialog design tool on a computer, comprising:
an information receiving unit configured to receive the information inputted by a dialog designer;
a dialog path forming unit configured to process the information in the information receiving unit and to output a result of processing the information;
a storage unit configured to store designed dialogs in a format of dialog data file; and
an outputting and displaying unit configured to receive the result,
wherein the dialog path forming unit is configured to generate a dialog structure comprising at least one dialog path,
wherein the outputting and displaying unit is configured to graphically display the dialog structure,
wherein the dialog path forming unit comprises a linking unit configured to link one state to a next related state to form at least one dialog path,
wherein the dialog path forming unit further comprises a loop detecting unit configured to detect and identify the loop in each dialog path and to allow the dialog designer to edit a dialog including the dialog path containing the detected loop, and
wherein the outputting and display unit is further configured to display a loop indicator in front of the dialog when the loop detector unit detects that the dialog path has a loop.

2. The dialog design tool of claim 1, wherein the information receiving unit comprises at least one state which includes at least one system prompt section and at least one user response section configured to allow the dialog designer to create anticipated responses to the corresponding system prompt.

3. The dialog design tool of claim 1, wherein the loop indicator is a graphic icon.

4. The dialog design tool of claim 1, wherein the outputting and display unit is configured to allow the dialog designer to overview the dialog path starting from different states and to edit the dialog in each state.

5. The dialog design tool of claim 1, further comprising a searching unit configured to receive a key word and to search the key word in the state or in the system prompt.

6. A method of developing state oriented dialogs implemented on a computer, comprising:
receiving at least one prompt;
generating at least one corresponding response according to the prompt;
forming at least one dialog path by linking one state to at least another one state by a linking unit;
detecting and identifying one or more loops in the dialog path by a loop detecting unit;
storing developed dialog in a format of dialog database file; and
outputting at least one dialog path graphically at an outputting and display unit, wherein the step of forming at least one dialog path by linking one state to at least another one state comprises linking a first state to a next related state based on the response in the first state, wherein the step of forming at least one dialog path by linking one state to at least another one state further comprises allowing the dialog designer to edit the dialogs in each state in the dialog path, and wherein the step of outputting at least one dialog path comprises a step of displaying a loop indicator in front of the dialog if the loop detecting unit detects that the dialog path has a loop.

7. The method of developing state oriented dialogs of claim 6, wherein outputting the at least one dialog path comprises partially or entirely expanding dialogs displayed in the at least one dialog path.

8. The method of developing state oriented dialogs of claim 6, wherein the step of inputting at least one prompt comprises indicating prompt type in the prompt indicator.

9. The method of developing state oriented dialogs of claim 6, wherein the step of generating at least one corresponding response comprises determining a confidence score of the response.

10. The method of developing state oriented dialogs of claim 6, wherein the loop indicator is a graphic icon.

11. The method of developing state oriented dialogs of claim 6, wherein the step of forming at least one dialog path by linking one state to at least another one state comprises forming a dialog structure including at least one dialog path.

12. The method of developing state oriented dialogs of claim 6, wherein the step of detecting and identifying loop in the dialog path comprises detecting and identifying the one or more loops in the dialog structure.

13. A state oriented dialog design system on at least one computer comprising:

a dialog manager configured to manage messages inputted by a dialog designer;

a dialog synthesizer configured to structurally link one state to at least one another state to form a dialog path, a storage unit configured to store designed dialogs in a format of dialog data file, and an outputting module configured to output graphically at least one dialog path and to display the at least one dialog path expanding partially or entirely to display dialogs in the dialog path, wherein the dialog synthesizer comprises a loop detecting unit configured to detect and identify one or more loops in the dialog structure, wherein the dialog synthesizer allows the dialog designer to edit the dialogs in each state in the dialog path, and wherein the outputting module is further configured to display a loop indicator in front of the dialog, if the loop detector unit detects that the dialog path has a loop.

14. The state oriented dialog design system of claim 13, wherein the dialog manager comprises:

at least one system prompt section configured to display at least one system prompt; and at least one user response section which allows the dialog designer to create at least one anticipated response to the at least one system prompt.

15. The state oriented dialog system of claim 13, wherein the dialog synthesizer is configured to synthesize a dialog structure comprising at least one dialog path.

16. The state oriented dialog system of claim 13, wherein the loop indicator is a graphic icon.

17. The state oriented dialog system of claim 13 further comprises a search module configured to search a key word in the state or in the system prompt.

\* \* \* \* \*